United States Patent [19]

Daloz

[11] Patent Number: 4,848,176
[45] Date of Patent: Jul. 18, 1989

[54] MULTISPEED REVERSING TRANSMISSION FOR AGRICULTURAL MACHINE

[75] Inventor: Jacques Daloz, Lons Le Saunier, France

[73] Assignee: Etablissements Daloz S.A., Lons Le Saunier, France

[21] Appl. No.: 129,806

[22] Filed: Dec. 7, 1987

[30] Foreign Application Priority Data

Dec. 9, 1986 [FR] France ............................. 86 17995

[51] Int. Cl.⁴ .............................................. F16H 3/08
[52] U.S. Cl. .................................... 74/333; 74/360; 74/375
[58] Field of Search ................ 74/333, 363, 375, 374, 74/373, 360

[56] References Cited

U.S. PATENT DOCUMENTS

| | | | |
|---|---|---|---|
| 1,182,752 | 5/1916 | Campbell | 74/375 |
| 2,096,770 | 10/1937 | Wagner | 74/375 |
| 2,506,670 | 5/1950 | Kamlukin | 74/333 X |
| 2,662,800 | 12/1953 | Hoffman | 74/333 V X |
| 3,293,933 | 12/1966 | Foxwell | 74/375 X |
| 3,827,276 | 8/1974 | Willers | 74/375 X |
| 4,226,135 | 10/1980 | Winter | 74/360 X |
| 4,287,791 | 9/1981 | Numazawa et al. | 74/375 X |
| 4,485,687 | 12/1984 | Burke et al. | 74/333 X |
| 4,611,504 | 9/1986 | Rundle | 74/363 X |
| 4,627,301 | 12/1986 | Bainbridge et al. | 74/333 |

Primary Examiner—Dwight G. Diehl
Attorney, Agent, or Firm—Herbert Dubno; Andrew Wilford

[57] ABSTRACT

A multispeed reversing transmission has a housing, an input shaft rotatable in the housing and adapted to be rotated by a drive, and an output shaft rotatable in the housing adjacent the input shaft and adapted to be connected to a load. At least one reverse gear and two different forward gears are fixed axially and rotationally on the input shaft axially spaced from one another and at least one respective reverse gear and two different respective forward gears are rotatable on the output shaft. At least one coupling member rotationally fixed but axially displaceable on the output shaft is displaceable between a reverse position operatively engaging the reversing gear of the output shaft and rotationally coupling same to the output shaft and a forward position operatively engaging at least one of the forward gears of the output shaft and rotationally coupling same to the output shaft.

10 Claims, 2 Drawing Sheets

# MULTISPEED REVERSING TRANSMISSION FOR AGRICULTURAL MACHINE

FIELD OF THE INVENTION

The present invention relates to a transmission. More particularly this invention concerns a multispeed reversing transmission of the type used on a small agricultural tractor or machine.

BACKGROUND OF THE INVENTION

It is standard to provide, for instance, a two- or three-wheel tractor of the type the operator walks behind with a transmission offering several forward speeds and at least one reverse speed. Such a tractor can include or carry a mower, sickle-bar, or the like, can be used to pull a cart, or can push a blade or cultivator. The several forward speeds are needed for the various tasks the machine performs, which are done at different speeds depending on terrain and other factors, and the reverse is normally only needed occasionally, for instance for backing out of a shed or maneuvering in very tight places.

As a rule reverse is controlled by a separate level which protrudes from the transmission adjacent the standard gear-change lever and which must be actuated and held so long as the machine is backing up. This is quite inconvenient when, as is often the case, the machine is in an inconvenient location like on the side of a steep slope, as it requires that the operator take one of his or her hands off the steering wheel or handle-bars of the device. What is more the operation of disengaging the clutch, typically operated by another handle or pedal, then pulling or pushing the reverse lever and holding it in the actuated position, and then reengaging the clutch takes times so that if, for instance, the machine is on a slope it can start to roll during the reversal operation unless the operator also manages to engage the brake.

In some systems the reversal is obtained by switching a simple direction-reversing gear set into the gear train. This has the advantage that it gives as many reverse speeds as there are forward speeds, but has the concomitant disadvantage that it makes possible a very high and potentially dangerous reverse speed.

OBJECTS OF THE INVENTION

It is therefore an object of the present invention to provide an improved reversing multispeed transmission.

Another object is the provision of such a reversing multispeed transmission which overcomes the above-given disadvantages, that is which is easily reversed with no complicated maneuvering necessary, and that can, if desired, provided several preferably low reverse speeds.

A further object is to provide such a transmission which is particularly suitable for use in a small agricultural machine or tractor, but which is by no means limited to such use.

SUMMARY OF THE INVENTION

A multispeed reversing transmission according to the invention has a housing, an input shaft rotatable in the housing and adapted to be rotated by a drive, and an output shaft rotatable in the housing adjacent the input shaft and adapted to be connected to a load. At least one reverse gear and two different foward gears are fixed axially and rotationally on the input shaft axially spaced from one another and at least one respective reverse gear and two different respective forward gears are rotatable on the output shaft. At least one coupling member rotationally fixed but axially displaceable on the output shaft is displaceable between a reverse position operatively engaging the reversing gear of the output shaft and rotationally coupling same to the output shaft and a forward position operatively engaging at least one of the forward gears of the output shaft and rotationally coupling same to the output shaft.

This coupling member therefore acts like a clutch that itself takes care of switching between reverse and forward travel. This can be done very easily and can be controlled, for example, by a simple hand lever of the type normally used to operate clutches on a motorcycle or handle-bar equipped machine.

According to a further feature of this invention the reversing gears have a higher stepdown ratio than any of the forward gears. Thus reverse will always be a relatively slow speed, which is all that is usually needed for close-quarter maneuvering and so on.

The drive of this invention comprises an engine and a clutch connected between the engine and the input shaft. Thus speed change can be made with the transmission parts stationary, as speed or direction is not normally changed unless the vehicle is stationary, unlike a highway vehicle where transmission ratio is changed as speed changes.

The system of this invention can further have a sleeve rotatable and axially displaceable on the output shaft, rotatably carrying at least one of the forward gears, and operatively rotationally engageable with the coupling member, at least one of the forward gears being rotatable on the sleeve and a second coupling member distinct from the first-mentioned coupling member and engageable between the one forward gear and the sleeve for rotationally coupling same. In such an arrangement another of the forward gears of the output shaft is fixed on the second coupling member and engageable only with the respective forward gear of the input shaft in a predetermined axial position of the second coupling member. Moreover it is possible in such an arrangement for two such forward gears to flank the other forward gear and be rotatable on the sleeve. In this case the coupling members are displaceable between end positions respectively coupling the flanking gears to the sleeve and through a center position out of engagement with the flanking gears and with the other forward gear meshing with the respective forward gear of the input shaft.

It is also within the scope of this invention for all of the forward gears of the output shaft to be rotatable on the sleeve and for the coupling member to be displaceable through respective positions coupling these output-shaft forward gears to the sleeve.

In accordance with a further feature of this invention the system has a sleeve axially fixed but rotatable on the output shaft and couplable with the coupling member and an element unitarily formed with two such output-shaft forward gears. This element is rotationally fixed on the sleeve and displaceable axially between a position with one of its forward gears meshing with the respective input-shaft forward gear and the other of its forward gears out of mesh with the respective input-shaft forward gear and an opposite end position with the other of its forward gears meshing with the respective input-shaft forward gear and the one forward gear out of mesh with the respective input-shaft forward gear.

In all the systems according to this invention the coupling member has oppositely axially directed teeth operatively engageable with the output-shaft gears. Since direction is changed when the transmission is not rotating, it is not necessary to provide fiber plates or the like as on standard clutches, instead the arrangement can be like a simple jaw clutch that operates with extremely high efficiency once coupled up.

DESCRIPTION OF THE DRAWING

The above and other objects, features, and advantages will become more apparent from the following, it being understood that any feature described with reference to one embodiment of the invention can be used where possible with any other embodiment and that reference numerals not specifically mentioned with reference to one figure but identical to those of another refer to structure that is functionally if not structurally identical. In the accompanying drawing.

SPECIFIC DESCRIPTION

Figure 1:
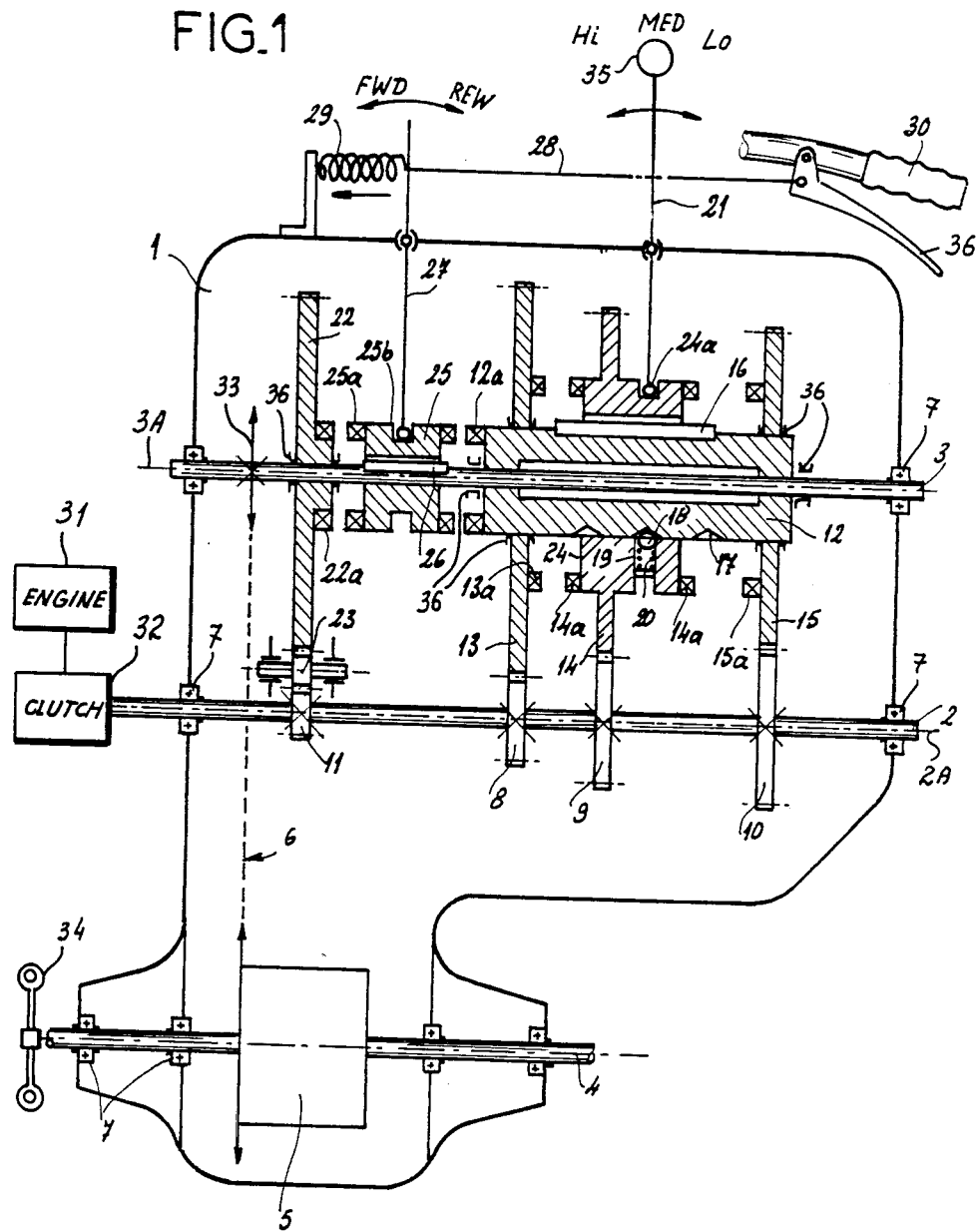
FIG. 1 is an axial section through a first embodiment of the transmission of this invention, having three forward and one reverse gear.

As seen in FIG. 1 a transmission according to this invention has a housing 1 having an input shaft 2 and an output shaft 3 rotatable about respective parallel axes 2A and 3A in bearings 7 but not movable axially or radially. The shaft 2 is connected via a clutch 32 to an engine 31, typically a small internal-combustion engine, and the shaft 3 carries a sprocket 33 that is connected via a chain 6 to a differential 5 in turn connected to an axle 4 on which vehicle wheels 34 (only one shown) are mounted.

The input shaft 2 carries three forward gears 8, 9, and 10 of different sizes and a single reverse gear 11. The gears 8 through 11 are fixed rotationally and axially to the shaft 2 and are spaced axially therealong. The gear 11 is smaller than the gear 8 which in turn is smaller than the gear 9 which is smaller than the gear 10.

The output shaft 3 carries a sleeve 12 that itself is free only to rotate on this shaft 3 but that is restrained against axial movement on this shaft 3. In turn this sleeve 12 carries three gears 13, 14, and 15 respectively mesh with the gears 8, 9, and 10. The gears 13 and 15 are restricted like the sleeve 12 by means shown schematically at 36 from moving axially, so that they always mesh with the respective gears 8 and 10, but otherwise are free to rotate on the sleeve 12 about the axis 3A. The gear 14 can move axially on the sleeve 12, but has a hub 24 rotationally coupled thereto by a spline or key formation 16. In a center position this gear 14 meshes with the gear 9. The axially opposite ends of the hub 24 are formed with teeth 14a engageable axially with complementary teeth 13a and 15a formed on the geaars 13 and 15 so that the gear 14 can be shifted to opposite end positions in which it is rotationally coupled to the respective gears 13 and 15. The ratios are such that the gear train 8, 13 is responsible for high-ratio low-speed forward travel, the gear train 9, 14 for intermediate-ratio and -speed travel, and gear train 10, 15 for low-ratio high-speed travel.

A gear-change lever or knob 35 is connected to a fork 21 pivotal in the housing 1 and engaging in a groove 24a of the hub 24 to move it axially between the end positions coupling the sleeve 12 to the gears 8 or 10 or the central position coupling it to the gear 9. The sleeve 12 is formed with three axially spaced and radially outwardly open notches or recesses 17 in which a ball 18 carried in a bore 19 of the hub 24 can engage. A spring 20 urges the ball 18 radially inward so that once set in any of these three positions the gear 14 is positively retained therein.

Another slideable coupling member 25 is provided on the shaft 3 adjacent the sleeve 12. This member 25 is movable on the shaft 3 along its axis 3A but is rotationally coupled thereto by a spline or key 26. It lies between one end of the sleeve 12 and a large-diameter reversing gear 22 meshing via a pinion 23 with this gear 11. This member 25 in turn is formed on each of its ends with teeth 25a engageable with teeth 12a and 22a of the sleeve 12 and gear 22, like the teeth 14a with the teeth 13a and 15a. In one end position of the member 25, therefore, the shaft 3 is coupled to the sleeve 12 and in the other end position to the gear 22.

A fork 27 engages in a groove 25b of the member 25 to move it between these end positions. This fork 27 is in turn displaceable by a cable 28 connected to a lever 36 on a handlebar 30 into the position with the teeth 22a and 25a engaged for reversing, and is urged into the opposite forward-motion position by a tension spring 29. The fork 21 that operates the gear 14 is not connected to the cable 28.

In this transmission the greatest stepdown is achieved in reverse. Thus reverse gear is even slower than first gear which takes place through gear train 8, 13. Thus with the system of this invention reverse gear is engaged simply by pulling on the hand lever 36 after, of course, the clutch 32 is disengaged. This reversing is, as is usual in a tractor, without respect to the forward speed the transmission is set by means of the lever 35 since such a machine is typically started in whatever forward gear it is to run in. The vehicle is invariably stopped when forward speed is changed.

Figure 2:
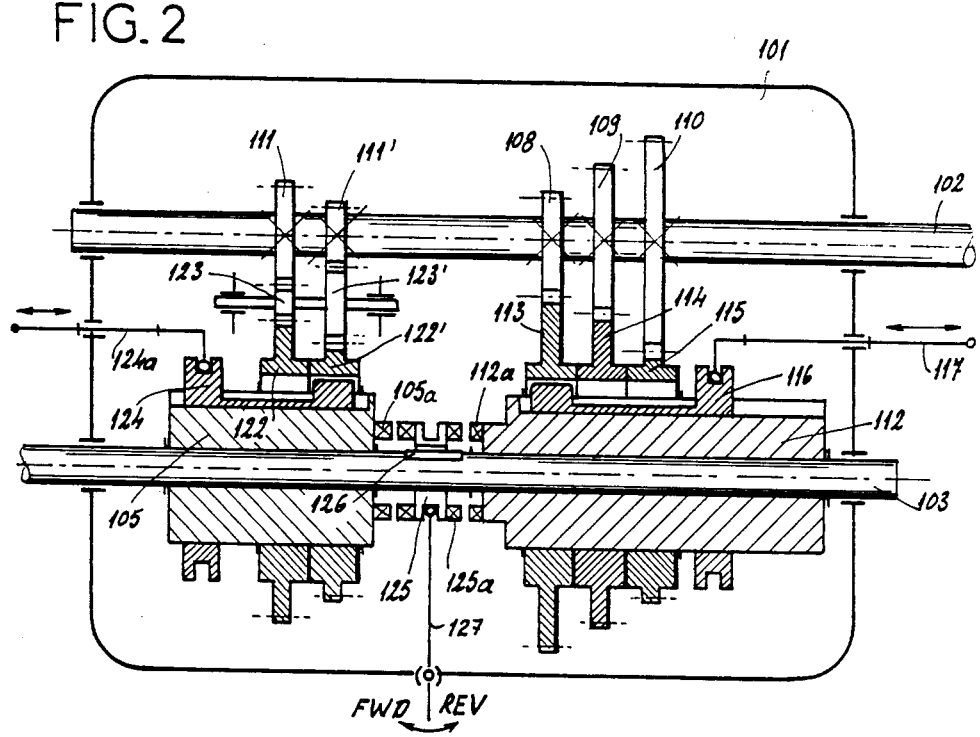
FIG. 2 is a view like FIG. 1 of a second transmission having three forward and two reverse gears.

The arrangement of FIG. 2 has a housing 101 provided with an input shaft 102 and an output shaft 103. Three different forward input gears 108, 109, and 110 are carried on the shaft 102 along with two different reverse input gears 111 and 111'. The gear 111' is smaller than the gear 108 and the gear 111 is intermediate in size between the gears 108 and 109.

The output shaft 103 carries a sleeve 112 on which are rotatable forward-travel output gears 113, 114, and 115 in permanent mesh with the respective gears 108, 109, and 110. A coupling member 116 is displaceable by a forward-speed selecting rod 117 along the sleeve 112 to couple any one of these gears 113, 114, or 115 to the sleeve 112 by a key-like formation. Similarly the shaft 103 carries a further sleeve 105 on which are rotatable reverse-travel output gears 122 and 122' meshing via respective reversing gears 123 and 123' with the gears 111 and 111'. Another coupling member 124 operated by a reverse-speed selecting rod 124a can couple either of these gears 122 or 122' with the sleeve 105 by another key-like formation.

In this arrangement a main coupling member 125 is rotationally coupled to the shaft 103 by a keyway 126 to the shaft 103 and has on its opposite ends teeth 125a meshable either with teeth 105a of the sleeve 105 or with teeth 112a of the sleeve 112. A direction-selecting fork 127 determines whether the member 125 couples the shaft 103 to the forward-travel sleeve 112 or to the reverse-travel sleeve 105.

Such a system therefore has a low-low and a low reverse speed, and low, intermediate, and high forward speeds. The lower reverse speed is slower than the lowest forward speed. Once again the system can be switched between forward and reverse travel without changing either of the reverse or forward gear ratios.

Figure 3:
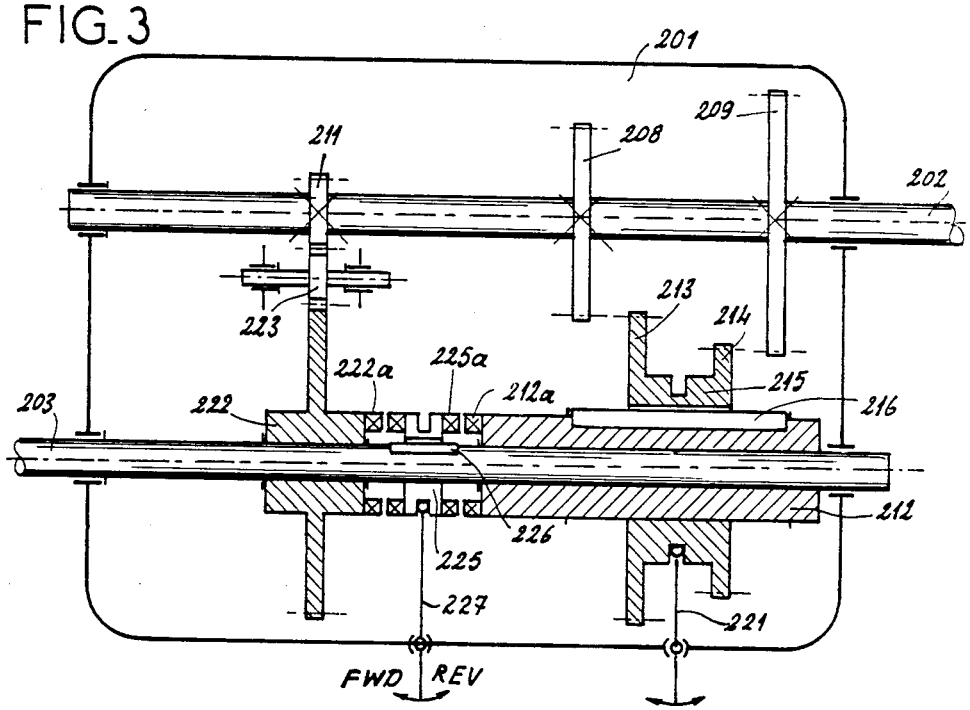
FIG. 3 is a view like FIG. 1 of a third transmission having two forward and one reverse gear.

In FIG. 3 the housing 201 has an input shaft 202 to which are fixed small and large forward-travel gears 208 and 209 and a smaller reverse gear 211 and an output shaft 203 on which are rotatable but not axially displaceable a forward-movement sleeve 212 and a reverse gear 222. The latter meshes continuously via a pinion 223 with the gear 211 and the former carries a two-part gear 215 itself formed with forward output gears 213 and 214 respectively meshable with the gears 208 and 209. A forward-travel speed selector 221 can displace the double gear 215 to select which gear train 208, 213 or 209, 214 is effective.

A direction-selecting lever 227 can move a coupling member 225 rotationally fixed by a keyway 226 to the shaft 203 into one end position with teeth 225a engaging teeth 212a of the forward-travel sleeve 212 or an opposite end position with opposite teeth 225a engaging teeth 222a of the gear 222. Once again the reverse speed will be lower than the lowest forward speed, presuming identical input speed.

I claim:

1. A multispeed reversing transmission comprising:
   a housing;
   an input shaft rotatable in the housing and adapted to be rotated by a drive;
   an output shaft rotatable in the housing adjacent the input shaft and adapted to be connected to a load;
   at least one reverse gear and two different forward gears fixed axially and rotationally on the input shaft axially spaced from one another;
   at least one respective reverse gear and two different respective forward gears rotatable on the output shaft;
   at least one first coupling member rotationally fixed but axially displaceable on the output shaft and displaceable between a reverse position operatively engaging the reversing gear of the output shaft and rotationally coupling same to the output shaft and a forward position operatively engaging at least one of the forward gears of the output shaft and rotationally coupling same to the output shaft;
   a sleeve rotatable on the output shaft and operatively rotationally engageable with the first coupling member, at least one of the forward gears being rotatable on the sleeve; and
   a second coupling member distinct from the first coupling member and engageable between the one forward gear and the sleeve for rotationally coupling same.

2. The multispeed reversing transmission defined in claim 1 wherein the reversing gears have a higher stepdown ratio than any of the forward gears.

3. The multispeed reversing transmission defined in claim 1 wherein the drive comprises an engine and a clutch connected between the engine and the input shaft.

4. The multispeed reversing transmission defined in claim 1 wherein another of the forward gears of the output shaft is fixed on the second coupling member and engageable only with the respective forward gear of the input shaft in a predetermined axial position of the second coupling member.

5. The multispeed reversing transmission defined in claim 4 wherein two such forward gears flanking the other forward gear are rotatable on the sleeve, the coupling member being displaceable between end positions respectively coupling the flanking gears to the sleeve and through a center position out of engagement with the flanking gears and with the other forward gear meshing with the respective forward gear of the input shaft.

6. The multispeed reversing transmission defined in claim 1 wherein all of the forward gears of the output shaft are rotatable on the sleeve, the coupling member being displaceable through respective positions coupling these output-shaft forward gears to the sleeve.

7. A multispeed reversing transmission comprising:
   a housing;
   an input shaft rotatable in the housing and adapted to be rotated by a drive;
   an output shaft rotatable in the housing adjacent the input shaft and adapted to be connected to a load;
   at least one reverse gear and two different forward gears fixed axially and rotationally on the input shaft axially spaced from one another;
   at least one respective reverse gear and two different respective forward gears rotatable on the output shaft; and
   at least one coupling member rotationally fixed but axially displaceable on the output shaft and displaceable between a reverse position operatively engaging the reversing gear of the output shaft and rotationally coupling same to the output shaft and a forward position operatively engaging at least one of the forward gears of the output shaft and rotationally coupling same to the output shaft;
   a sleeve axially fixed but rotatable on the output shaft and couplable with the coupling member;
   an element unitarily formed with two such output-shaft forward gears, the element being rotationally fixed on the sleeve and displaceable axially between a position with one of its forward gears meshing with the respective input-shaft forward gear and the other of its forward gears out of mesh with the respective input-shaft forward gear and an opposite end position with the other of its forward gears meshing with the respective input-shaft forward gear and the one forward gear out of mesh with the respective input-shaft forward gear.

8. The multispeed reversing transmission defined in claim 7 wherein the coupling member has oppositely axially directed teeth operatively engageable with the output-shaft gears.

9. A multispeed reversing transmission comprising:
   a housing;
   an input shaft rotatable in the housing and adapted to be rotated by a drive;
   an ouput shaft rotatable in the housing adjacent the input shaft and adapted to be connected to a load;
   at least one reverse gear and two different input forward gears fixed axially and rotationally on the input shaft axially spaced from one another;
   a sleeve axially fixed but rotatable on the output shaft;
   at least one reverse gear rotatable on the output shaft;
   at least one reversing pinion in continuous mesh between the reverse gears;

respective output forward gears fixed axially but not rotationally on the sleeve axially spaced from one another level with the respective input forward gears;

a first coupling member rotationally fixed but axially displaceable on the output shaft and displaceable between a reverse position operatively engaging the reversing gear of the output shaft and rotationally coupling same to the output shaft and a forward position operatively engaging the sleeve and rotationally coupling same to the output shaft; and a second coupling member rotationally fixed on the sleeve but axially displaceable thereon between one end position engaging one of the output forward gears and coupling same to the sleeve and an opposite end position engaging only the other output forward gear and coupling same to the sleeve.

10. The transmission defined in claim 9 wherein the output reverse gear and sleeve flank the first coupling member and have respective teeth directed axially toward the coupling member, the first coupling member having axially oppositely directed ends formed with complementary teeth engageable with the teeth of the output reverse gear and sleeve in respective axially offset end positions of the first coupling member.

* * * * *